Feb. 14, 1967 W. T. OSBORNE 3,303,875
HEATING AND COOLING SYSTEM
Filed Oct. 8, 1964
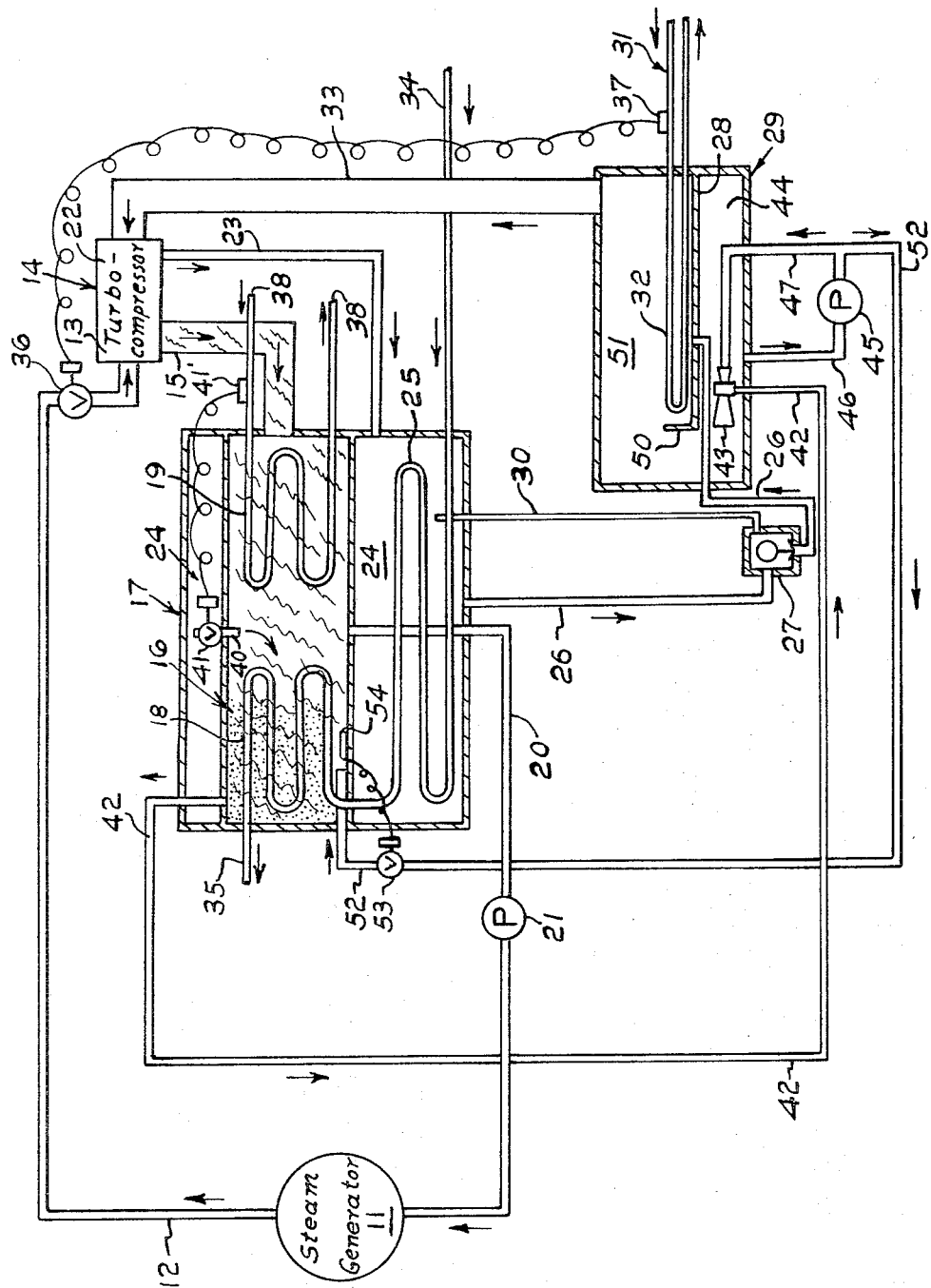
INVENTOR.
WILLIAM T. OSBORNE
BY
*Robert F. Ruemeli*
ATTORNEY

United States Patent Office 3,303,875
Patented Feb. 14, 1967

3,303,875
HEATING AND COOLING SYSTEM
William T. Osborne, Syracuse, N.Y., assignor to Carrier Corporation, Syracuse, N.Y., a corporation of Delaware
Filed Oct. 8, 1964, Ser. No. 402,602
5 Claims. (Cl. 165—39)

This invention relates to heating and cooling and, more particularly, to a system and method for regulating heating and cooling capacities of a heating and cooling system.

Various capacity controls for heating and cooling systems are more fully discussed in a copending United States patent application of Louis H. Leonard, Jr., for a "Heating and Cooling System," Serial No. 377,319, filed June 23, 1964, wherein during simultaneous heating and cooling operation of the system the heating capacity varies inversely of the cooling capacity which is regulated responsive to the cooling demand on the system.

The present invention is directed to controlling the heating capacity of a heating and cooling system independently of the cooling capacity and, more particularly, to regulating the cooling capacity responsive to the cooling demand and the heating capacity responsive to the heating demand on the system.

A primary object of this invention is to provide a new and improved heating and cooling system and a method of providing heating and cooling. More particularly, it is an object of this invention to control the heating capacity responsive to the heating demand and independently of the cooling capacity.

A more specific object is to provide a new and improved steam powered heating and cooling system including a refrigerant side having a chilled water line for providing chilled water to a load to be cooled, a power side for supplying steam to operate the refrigerant side and including a steam condenser having a first condensing bundle to condense steam and reject the heat involved therein and a second condensing bundle to condense the steam and transfer the heat involved therein to heating water for supply to a load to be heated, with cooling capacity control responsive to the temperature of the chilled water, and heating capacity control responsive to the temperature of the heating water.

Another more specific object is provision of a new and improved method of operating a heating system having a steam condenser, including the steps of passing steam into the steam condenser, removing heat from the steam in the steam condenser to heat a load, passing a non-condensible vapor into the steam condenser to regulate the condensing capacity and thereby the heating capacity of the system, and regulating the heating capacity of the system responsive to the heating demand by regulating the quantity of the noncondensible vapor in the steam condenser.

These and other objects will be apparent from the following description and the accompanying drawing which is a flow diagram of a heating and cooling system illustrating a preferred embodiment of the invention.

The invention is illustrated in the form of apparatus for providing cooling, heating and simultaneous heating and cooling. The system may be considered as having a power side including a circuit for the circulation of a power fluid, and a refrigerant side including a circuit for the flow of a refrigerant fluid under the influence of drive means on the power side driven by the power fluid, with the operation of the apparatus regulated by a control system.

The invention will be described with reference to a preferred power fluid, which is water, and a preferred refrigerant which is octafluorocyclobutane, commonly referred to as C318 and having a chemical formula $C_4F_8$. These fluids are particularly preferred because of their relative immiscibility and because they are inherently highly stable and do not tend to decompose or chemically react with each other or other materials in the system, or cause or promote corrosion and undesirable by-products. Also, this refrigerant is a relatively noncondensible vapor at the temperatures and pressures at which the power fluid (water) condenses as well as the usual ambient atmospheric conditions of temperature and pressure. However, other power fluids and refrigerants having the desired chemical and physical properties may be utilized within the scope of this invention.

Referring to the drawing, the power side includes a steam generator 11 which supplies steam through a steam supply line 12 to a turbine 13 of a turbocompressor 14. From the turbine 13 a steam discharge line 15 passes exhaust steam (indicated by wavy lines) into a steam condenser 16 which is part of a composite condensing unit 17. The steam is condensed by a first steam condensing bundle 18 and a second steam condensing bundle 19 and the steam condensate is passed from the steam condenser 16 to the steam generator 11 through a steam condensate line 20 including a steam condensate pump 21.

The refrigerant side of the system includes a refrigerant compressor 22 of the turbocompressor 14. The compressor 22 is driven by the turbine 13 for passing compressed refrigerant vapor through a high pressure line 23 to a refrigerant condenser 24 which is part of the condensing unit 17 and envelops the steam condenser 16 for effectively preventing the entry of ambient air into the steam condenser. A refrigerant condensing bundle 25 in the refrigerant condenser 24 condenses the refrigerant vapor; the condensate flows through a condensate line 26 including a suitable refrigerant flow restricting means such as a float valve unit 27 and into a refrigerant pan 28 within an evaporator or cooler 29. A suitable equalizer line 30 is provided between the float valve unit 277 and the refrigerant condenser 24. A chilled water line 31 includes a chilled water bundle 32 in the pan 28 to be flooded by refrigerant which vaporizes and cools chilled water suitably circulating through the line 31 to a load to be cooled. From the cooler 29 the refrigerant vapor is withdrawn through a suction line 33 to the compressor 22, thus completing a basic refrigeration cycle.

Tower water for condensing steam and refrigerant vapor passes through a tower water inlet line 34 to the refrigerant condensing bundle 25 and then through the first steam condensing bundle 18 from which the tower water is returned to the tower through an outlet line 35.

Cooling capacity control is effected by controlling the output of the turbocompressor 14. For example, the steam supplied through the steam supply line 12 to the turbine 13 may be regulated as by a modulating steam pressure control valve 36 in the steam supply line 12 with the valve regulated by means of a suitable sensor 37 on the chilled water line 31. Thus, as the cooling demand increases the steam regulating valve 36 is opened an additional amount to increase the steam pressure driving the turbine, thereby increasing the turbocompressor refrigerant output. Conversely, by closing the valve 36 a suitable amount as the cooling demand drops, the output of the turbocompressor 14 and therefore the quanity of refrigerant passed by the compressor 22, decreases to decrease the cooling capacity. Alternatively, the cooling capacity may be regulated by the sensor 37 operating apparatus for modulating the heat input to the steam generator.

The second steam condensing bundle 19 in the steam condenser 16 is part of a heated water line 38 for providing hot water to a load to be heated. The second condensing bundle 19 is at an end of the steam condenser 16 (right end) which receives the discharge steam from the turbine 13 through the steam discharge line 15. The first condensing bundle 18 through which the tower water is circulated is at an opposite end (left end) of the steam condenser 16 and as illustrated, is generally horizontally aligned with the second bundle 19.

Heating capacity control is effected by passing a noncondensible vapor (indicated by dots) into the steam condenser 16 to blanket the first condensing bundle 18 while maintaining the second condensing bundle 19, which supplies heating water to the load to be heated, effectively free of such blanketing. Refrigerant vapor from the refrigerant condenser 24 passes through a bleed line 40 including a modulating refrigerant flow control valve 41 and into the steam condenser 16 generally in a space between the two steam condensing bundles 18 and 19. The control valve 41 is modulated between full open and closed positions responsive to a temperature sensor 41' on the hot water line so that as the hot water temperature drops, indicating an increase in the heating demand, the valve is opened an additional amount to increase the blanketing of the first condensing bundle 18 with refrigerant vapor, thereby reducing its condensing capacity to increase the saturated steam pressure and temperature in the steam condenser, thus increasing the heating capacity of the system. Conversely, as the hot water temperature increases, indicating a decrease in the heating demand, the sensor 41' causes the valve 41 to close somewhat to reduce the blanketing and therefore the steam temperature and heating capacity of the system. Alternatively, the refrigerant vapor may be passed from the cooler 29 to the valve 41.

Means for withdrawing the noncondensible vapor from the steam condenser 16 is provided in the form of a preferably substantially constant rate purge system including a purge line 42 opening into the end of the steam condenser 16 adjacent the first condensing bundle 18 and opposite the end including the steam inlet. The purge line communicates with the throat of a suitable jet pump 43 in a water sump portion 44 of the cooler 29 below the pan 28. Water for operating the jet pump 43 is provided by a water supply pump 45 having its inlet connected by a line 46 with the water sump 44 and its outlet connected by an impeller water line 47 with the jet pump 43, thus operating the jet pump to remove the refrigerant vapor and any water vapor carried thereby from the steam condenser 16. Refrigerant entering the sump passes as a vapor about a free left end wall 50 of the pan 28 and into an upper portion 51 of the cooler for return through the suction line 33 to the compressor 22.

Means for returning water from the sump 44 to the power side of the system is provided by a make-up line 52 connecting the outlet of the water supply pump 45 and the steam condenser 16. At low water level, a suitable shut-off valve 53 in the make-up water line 52 is opened by a sensor 54 in the bottom of steam condenser 16 to pass water to the steam condenser.

The invention provides a system and method for regulating the temperature of heating water supplied to a load to be heated independently of the cooling capacity of the system. By controlling the heating capacity of the system independently of the cooling capacity, optimum desired performance may be obtained from the machine. This feature is low in cost and substantially eliminates the formation of scale in the tubes of the condensing bundles 18 and 25 because the flow and temperature of the tower water may be completely uncontrolled.

While a preferred embodiment of the invention has been described and illustrated, it will be understood that the invention is not limited thereto since it may be otherwise embodied within the scope of the following claims.

I claim:

1. A steam powered heating and cooling system comprising a refrigerant side having means for providing cooling to a load to be cooled, a power side including means for supplying steam to operate the refrigerant side and means including a steam condenser for receiving steam and having a first condensing portion to condense the steam and a second condensing portion to condense the steam and supply heat to a load to be heated, and heating capacity control means for regulating the heating capacity of the system by regulating the condensing capacity of said first condensing portion responsive to the heating demand of the load to be heated.

2. A steam powered heating and cooling system comprising a refrigerant side having means including a chilled water line for providing chilled water to a load to be cooled, a power side including means for supplying steam to operate the refrigerant side and means including a steam condenser for receiving steam and having a first condensing portion to condense the steam and reject the heat involved therein and a second condensing portion to condense the steam and transfer the heat involved therein to heating water circulated therethrough for supply to a load to be heated, cooling capacity control means for regulating the cooling capacity of the system responsive to the temperature of the chilled water, and heating capacity control means for regulating the heating capacity of the system responsive to the temperature of the heating water.

3. The system of claim 2 wherein said heating capacity control means includes means for blanketing said first condensing portion with a noncondensible vapor to reduce its condensing capacity below maximum capacity and thereby increase the temperature of the steam entering the steam condenser, and for maintaining said second condensing portion effectively free of such blanketing for optimum heat transfer from the steam being condensed to the heating water.

4. The system of claim 3 wherein said cooling capacity control means include means for regulating the steam supplied to operate said refrigerant side.

5. A heating system comprising enclosing means for steam to be condensed, first means within said enclosing means for condensing said steam and rejecting the heat involved therein, second means within said enclosing means for condensing said steam and conserving the heat involved therein for supply to a load to be heated, means for passing steam into said enclosing means, means for passing into said enclosing means a fluid which is noncondensible vapor at normal operating conditions within said enclosing means, means for blanketing said first means with said fluid to suppress the condensing capacity thereof and for maintaining said second means relatively free of said fluid for effective heating of said second means, and means for regulating the heating capacity of said second means by regulating the blanketing of said first means responsive to the heating demand of said load.

No references cited.

MEYER PERLIN, *Primary Examiner.*

CHARLES SUKALO, *Examiner.*